United States Patent
Purkey et al.

(10) Patent No.: US 8,004,242 B1
(45) Date of Patent: Aug. 23, 2011

(54) SYSTEM AND METHOD FOR MANAGING DISTRIBUTION OF VEHICLE POWER IN A MULTIPLE BATTERY SYSTEM

(75) Inventors: Bruce A. Purkey, Rogers, AR (US); Dale B. Henningson, Manti, UT (US)

(73) Assignee: PH Ingenuities, LLC, Rogers, AR (US)

( * ) Notice: Subject to any disclaimer, the term of this patent is extended or adjusted under 35 U.S.C. 154(b) by 407 days.

(21) Appl. No.: 12/381,571

(22) Filed: Mar. 13, 2009

(51) Int. Cl.
*H02J 7/00* (2006.01)
*G01R 31/36* (2006.01)

(52) U.S. Cl. .......................... 320/132; 320/130; 702/63

(58) Field of Classification Search .................. 320/130, 320/132; 702/63
See application file for complete search history.

(56) References Cited

U.S. PATENT DOCUMENTS

| | | |
|---|---|---|
| 5,798,577 A | 8/1998 | Lesesky |
| 6,089,588 A | 7/2000 | Lesesky |
| 2002/0041174 A1 | 4/2002 | Purkey |
| 2006/0145654 A1 | 7/2006 | Douglas |
| 2008/0018439 A1 | 1/2008 | Kinsey |

OTHER PUBLICATIONS

Antares Engineering With Answers, "Trailer Power System", 2 pages, published prior to Mar. 13, 2009.
SurePower Industries, Inc., "Trail Charger Installation Guide", 2 pages, published prior to Mar. 13, 2009.
Anthony Liftgates, Inc., "Trail Charger", 1 page, Sep. 2005.
Tectran, "Info @ Tectran, Technical Bulletin", www.tectran.com, 1 page published prior to Mar. 13, 2009.

*Primary Examiner* — Bot Ledynh
(74) *Attorney, Agent, or Firm* — Schwartz Law Firm, P.C.

(57) ABSTRACT

A vehicle incorporates a crank battery, a rechargeable auxiliary battery, and an onboard electrical power source separate from the crank battery and the auxiliary battery. A battery charge controller manages a supply of electrical energy to the auxiliary battery to charge the auxiliary battery. The battery charge controller includes a first comparator for monitoring a voltage level of the crank battery, and a second comparator for monitoring a voltage level of the onboard electrical power source. A first switching device electrically couples the crank battery and the auxiliary battery to charge the auxiliary battery when the voltage level of the crank battery exceeds a first voltage threshold, and electrically decouples the crank battery and the auxiliary battery when the voltage level of the crank battery is below the first voltage threshold. A second switching device electrically couples the onboard power source and the auxiliary battery to charge the auxiliary battery when: (i) the voltage level of the crank battery is below the first voltage threshold and (ii) the voltage level of the onboard power source exceeds a second voltage threshold; and electrically decouples the onboard power source and the auxiliary battery when the voltage level of the onboard power source is below the second voltage threshold.

20 Claims, 5 Drawing Sheets

SYSTEM AND METHOD FOR MANAGING DISTRIBUTION OF VEHICLE POWER IN A MULTIPLE BATTERY SYSTEM

TECHNICAL FIELD AND BACKGROUND

The present disclosure relates broadly to a system and method for managing distribution of vehicle power in a multiple battery system. As will be understood by those skilled in the art, the various exemplary embodiments and implementations described herein may have application to all types of vehicles, such as tractor/trailer combinations, recreational vehicles, agricultural tractors, and other light and heavy duty vehicles.

The trucking industry has traditionally used tractor/trailer combinations to transport cargo over roadways to intended destinations. The tractor and one or more trailers are mechanically coupled together, and electrically linked via wires and cables to supply power to numerous electrical subsystems located on the tractor and/or the trailer. Many electrical subsystems (or "auxiliary loads") utilize electrical energy when the vehicle is running, and also utilize electrical energy provided by the vehicle's battery when the tractor engine is in an inactive or power-off condition. The crank battery supplies electrical power necessary to start the tractor's cranking system, and is charged by an alternator mechanically driven by the engine when running. In order to preserve sufficient cranking power, measures must generally be taken to avoid discharging the crank battery below a predetermined threshold voltage. The construction of the vehicle battery is well-known, and generally comprises a plurality of connected rechargeable lead-acid secondary cells.

In addition to various auxiliary loads powered by the tractor's electrical system, many modern tractor/trailer combinations have other integrated systems, such as electrically-powered liftgates, that have generally independent power sources. Liftgate batteries typically do not have their own charging system, and must therefore rely on power from the tractor or the reefer unit.

SUMMARY OF EXEMPLARY EMBODIMENTS

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

According to one exemplary embodiment, the present disclosure comprises a vehicle incorporating a crank battery, a rechargeable auxiliary battery, and an onboard electrical power source separate from the crank battery and the auxiliary battery. The term "battery" is used herein to refer both to a single battery and multiple batteries (i.e., a bank of batteries). A battery charge controller manages a supply of electrical energy to the auxiliary battery to charge the auxiliary battery (e.g., when the vehicle engine's electrical system is in an inactive or power-off condition). The battery charge controller includes a first comparator means for monitoring a voltage level of the crank battery, and a second comparator means (which may be identical to the first) for monitoring a voltage level of the onboard electrical power source. A first switching means electrically couples the crank battery and the auxiliary battery to charge the auxiliary battery when the voltage level of the crank battery exceeds a first voltage threshold, and electrically decouples the crank battery and the auxiliary battery when the voltage level of the crank battery is below the first voltage threshold. A second switching means (which may be identical to the first) electrically couples the onboard power source and the auxiliary battery to charge the auxiliary battery when: (i) the voltage level of the crank battery is below the first voltage threshold and (ii) the voltage level of the onboard power source exceeds a second voltage threshold; and electrically decouples the onboard power source and the auxiliary battery when the voltage level of the onboard power source is below the second voltage threshold.

According to another exemplary embodiment, the first voltage threshold is greater than 12.2 volts.

According to another exemplary embodiment, the second voltage threshold is greater than 13.2 volts.

According to another exemplary embodiment, the onboard electrical power source comprises an electrical system of an onboard refrigeration unit (or "reefer").

According to another exemplary embodiment, the electrical system of the refrigeration unit comprises a battery and an alternator.

According to another exemplary embodiment, the first and second switching means for electrically coupling the crank battery and the auxiliary battery, and for electrically coupling the onboard power source and the auxiliary battery comprises at least one switching device.

According to another exemplary embodiment, the switching device comprises a relay (e.g., electromagnetic or solid-state relay, or switching transistors or the like).

According to another exemplary embodiment, the first comparator means for monitoring a voltage level of the crank battery, and second comparator means for monitoring a voltage level of the onboard electrical power source comprises a microprocessor-based control module.

According to another exemplary embodiment, the rechargeable auxiliary battery is electrically connected to a vehicle liftgate.

In yet another exemplary embodiment, the disclosure relates to a heavy duty vehicle comprising a tractor/trailer combination, and including a vehicle power line electrically interconnecting the tractor and the trailer, a crank battery carried by the tractor and electrically connected to the vehicle power line, a rechargeable auxiliary battery carried by the trailer, a voltage converter (e.g., DC-DC converter) carried by the trailer and electrically connected to the auxiliary battery, and an onboard electrical power source carried by the trailer and separate from the crank battery, the auxiliary battery, and the voltage converter. A charge controller manages a supply of electrical energy to the voltage converter to charge the auxiliary battery. The charge controller comprises first comparator means for monitoring a voltage level of the crank battery, and second comparator means (which may be identical to the first) for monitoring a voltage level of the onboard electrical power source. First switching means electrically couples the crank battery and the voltage converter to charge the auxiliary battery when the voltage level of the crank battery exceeds a first voltage threshold, and for electrically decoupling the crank battery and the voltage converter when the voltage level of the crank battery is below the first voltage threshold. Second switching means electrically couples the onboard power source and the voltage converter to charge the auxiliary battery when: (i) the voltage level of the crank battery is below the first voltage threshold and (ii) the voltage level of the onboard power source exceeds a second voltage threshold, and for electrically decoupling the onboard power source and the voltage converter when the voltage level of the onboard power source is below the second voltage threshold.

According to another exemplary embodiment, the vehicle power line comprises a plurality of electrical conductors, and a multi-pin connector interconnecting conductors of the tractor and the trailer.

According to another exemplary embodiment, the connector comprises (e.g.) a SAE J560 seven-pin connector.

BRIEF DESCRIPTION OF THE DRAWINGS

The description of exemplary embodiments proceeds in conjunction with the following drawings, in which.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterite) is not intended to indicate or imply that the invention has been previously reduced to practice or that any testing has been performed.

Figure 1:
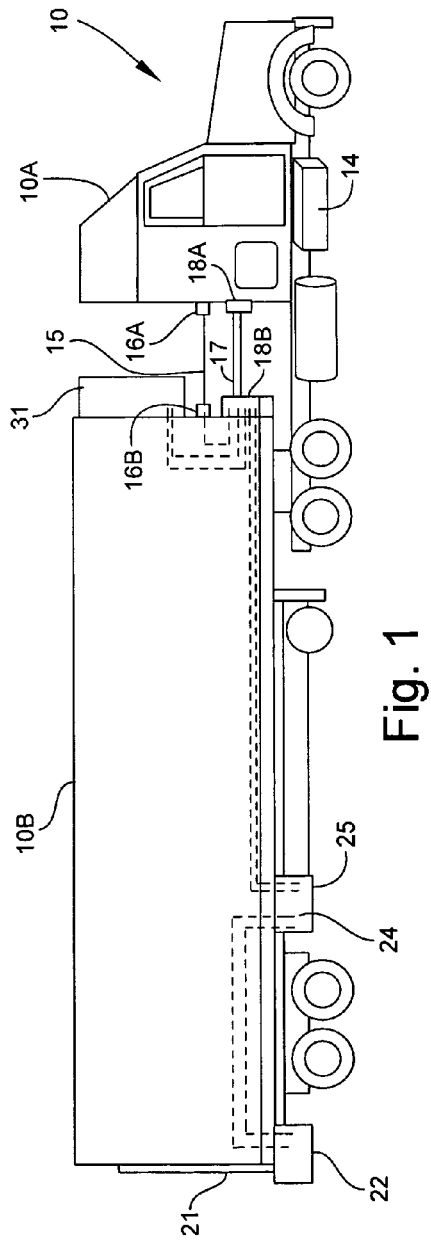
FIG. 1 is a schematic view of a tractor/trailer combination incorporating a battery charge controller according to one exemplary embodiment of the present disclosure.
Figure 2:
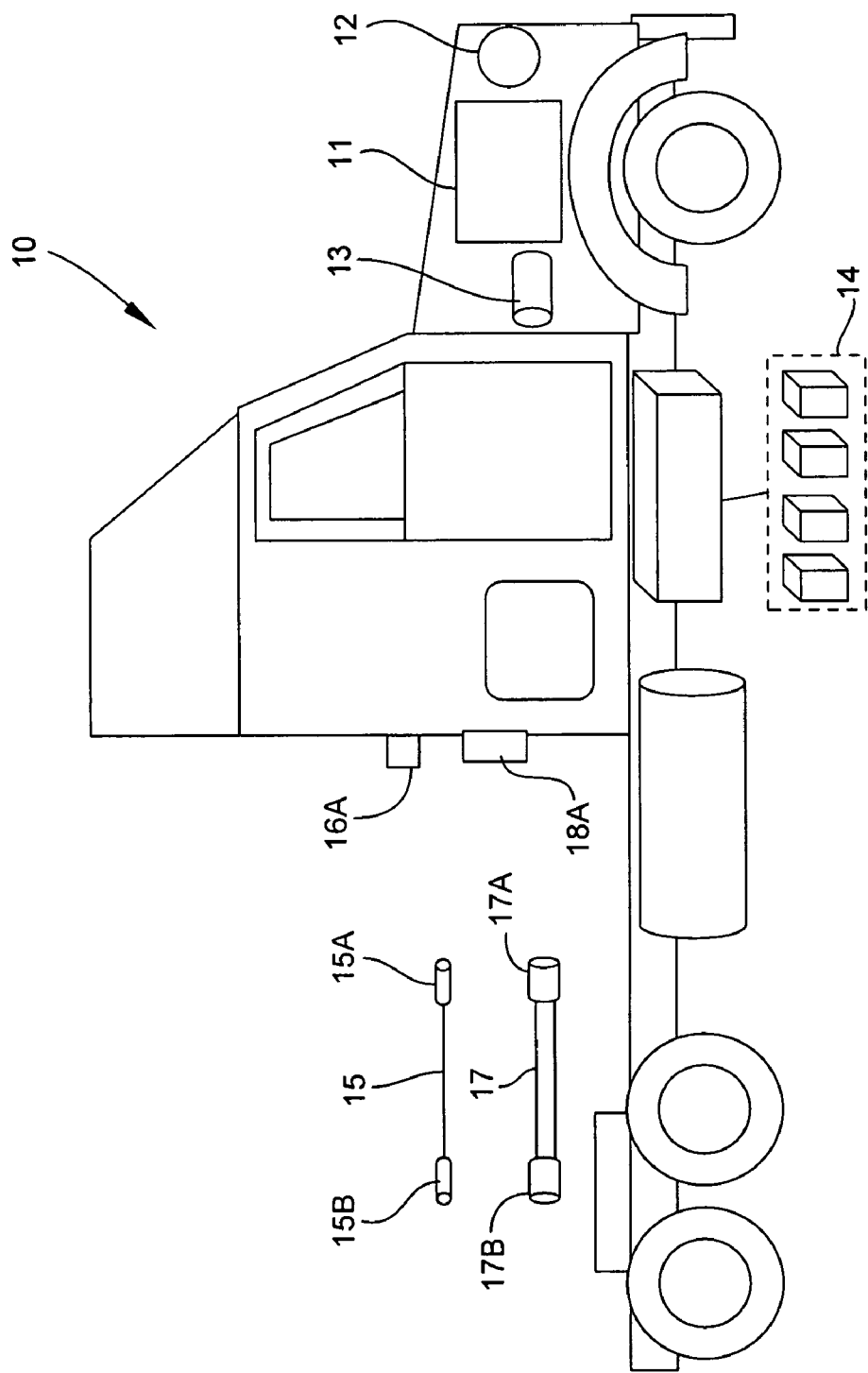
FIG. 2 is a schematic showing the exemplary tractor of the present disclosure.

Referring now specifically to the drawings, a vehicle incorporating a microprocessor-based battery charge controller according to one exemplary embodiment of the present invention is illustrated in FIG. 1, and shown generally at reference numeral 10. As shown in FIGS. 1 and 2, the exemplary vehicle 10 may comprise a heavy duty tractor/trailer combination employing standard mechanical and electrical power systems, including a tractor engine 11, alternator 12, starter 13, and "crank battery" 14 (e.g., bank of batteries), and various electrical subsystems in both the tractor 10A and the trailer 10B. As generally known and understood in the industry, the alternator 12 is mechanically driven by the tractor engine 11 and operates to charge the crank battery 14 when the vehicle 10 is running. Additionally, the alternator 12 may have a built-in voltage regulator linked to an onboard computer system which may adjust output voltage to the crank battery 14 based on certain factors including, for example, ambient air temperature and engine load.

In addition to powering the tractor's cranking system, the crank battery 14 is commonly used for supplying current to other electrical subsystems and vehicle accessory loads in both the tractor 10A and the trailer 10B. Examples of such subsystems include communication systems, audio systems, video systems, cargo lighting, microwave ovens, electric heaters, televisions, and the like. Many so-called "creature comforts" are often used by drivers with the engine 11 stopped and the alternator 12 inactive. The presence of these additional (parasitic) loads creates a generally high energy demand on the crank battery 14, and tends to deplete the energy available for starting the vehicle 10.

Figure 1A:
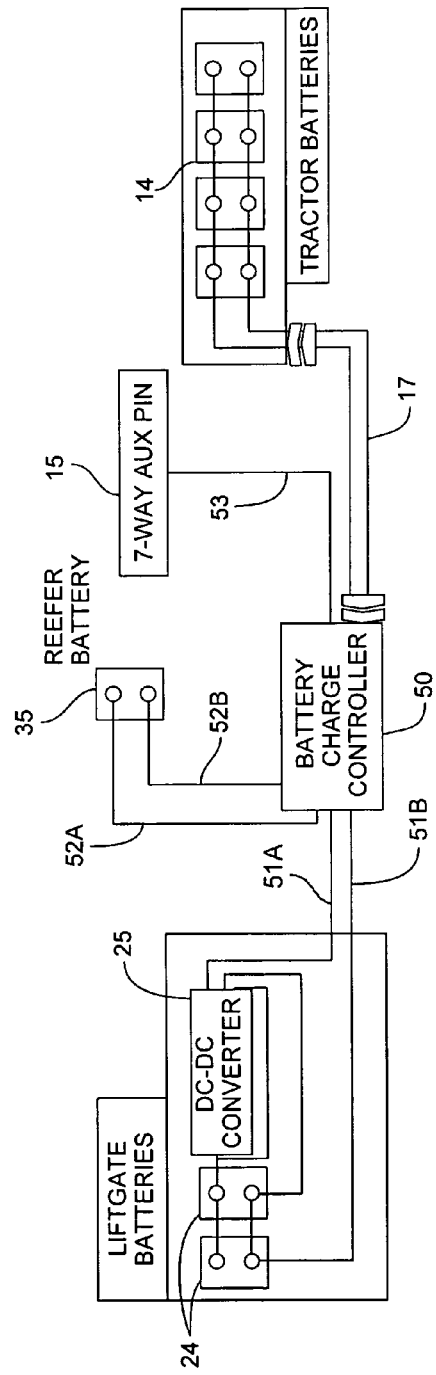
FIG. 1A is schematic illustrating various elements and features of the tractor/trailer combination shown in FIG. 1.
Figure 3:
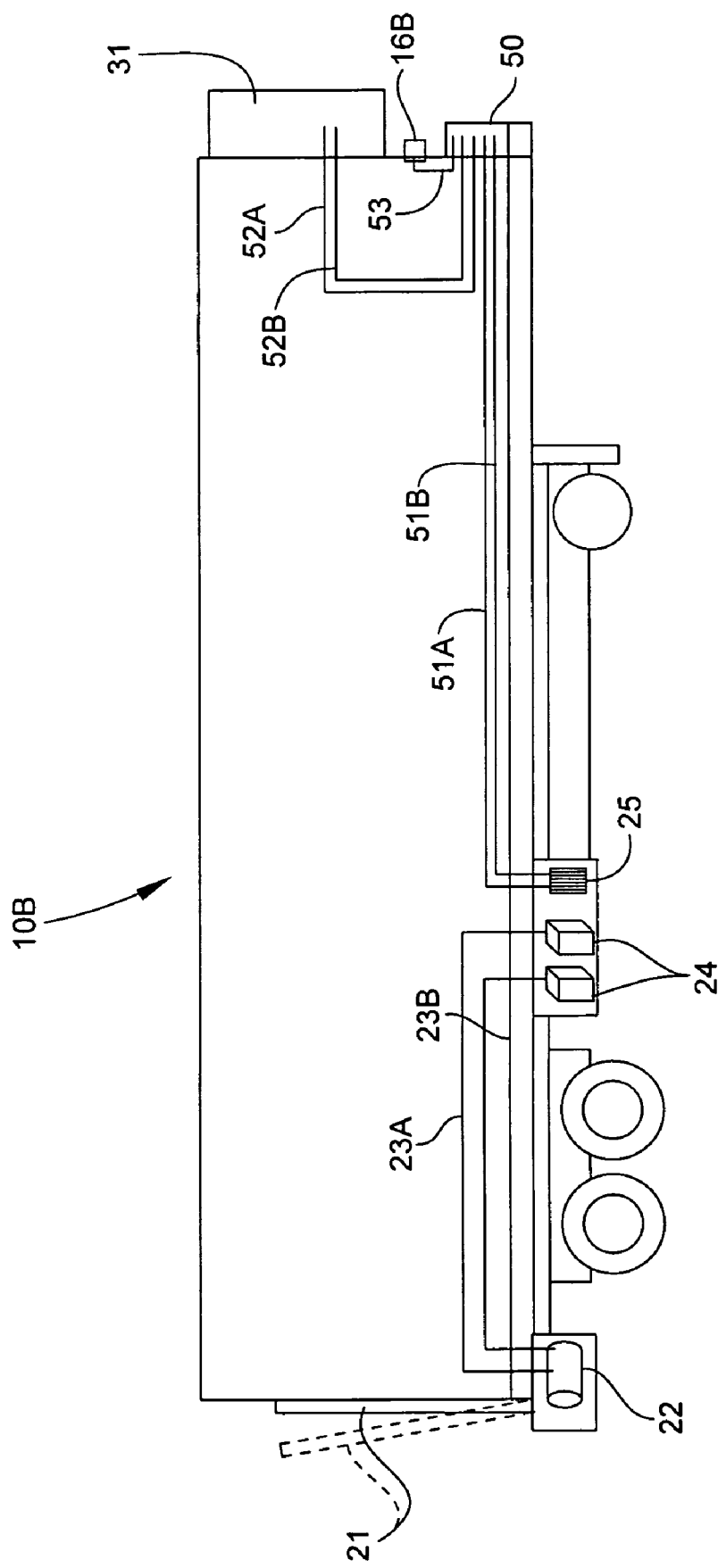
FIG. 3 is a schematic showing the exemplary trailer of the present disclosure.

Referring to FIGS. 1A, 2, and 3, the electrical subsystems of the trailer 10B may be electrically coupled to a power line (or "power bus" or "conductor") which communicates with the tractor's power system (e.g., crank battery 14 and alternator 12). In the exemplary embodiment, the vehicle power line comprises a plurality of electrical conductors to supply electrical power to electrical subsystems of the trailer 10B. The tractor 10A and trailer 10B may be electrically interconnected using a multi-pin (e.g., 7-way) power line cable 15 having male connecting ends 15A, 15B designed to plug into corresponding electrical sockets of multi-pin receptacles 16A, 16B communicating, respectively, with the tractor 10A electrical system and the power line of trailer 10B. The individual conductors are assigned to specific electrical subsystems, for example, power, ground, turn signals, brake lights, clearance lamps, emergency flashers, and other devices requiring electrical signals. The seventh pin on the power line cable 15 is a shared "auxiliary" pin used to operatively connect the trailer ABS, and for other specific electrical purposes or applications on individual tractor/trailer combinations. An example of a seven-pin connector is described in U.S. Pat. No. 4,969,839 to Nilsson, the entire disclosure of which is specifically incorporated herein by reference. Such connectors are well known and have been specified by the Society of Automotive Engineering (SAE) according to the standard number "SAE J560", the teachings of which are also incorporated herein by reference.

In addition to and separate from the power line cable 15, a standard single or dual-pole cable 17 ("auxiliary line") may be used for running current between the tractor 10A and trailer 10B. Like power line cable 15, the dual-pole cable 17 has male connecting ends (e.g., pins) 17A, 17B designed to plug into corresponding electrical sockets of dual-pole receptacles 18A, 18B communicating, respectively, with the tractor 10A electrical system and the trailer 10B (via battery charge controller 50, described below).

Other electrical subsystems of the vehicle 10 may be separately powered by sources generally independent of the tractor engine's electrical system. For example, many heavy-duty vehicles come equipped with electrically-powered liftgates, such as that shown at 21 in FIGS. 1 and 3. The liftgate 21 is powered by an electric motor 22 connected via cables 23A, 23B to liftgate batteries 24 ("auxiliary battery") which power the motor 22. The liftgate batteries 24 do not have their own charging system, and may be electrically coupled to the crank battery 14 or alternator 12 of the tractor 10A or other power source, discussed below. In the exemplary embodiment, a DC-DC converter 25 is mounted closely adjacent the liftgate batteries 24 on the trailer 10B, and is operatively connected (e.g., via the power line cable 15 or dual pole cable 17) to the tractor engine's electrical system. The DC-DC converter 25 functions in a conventional manner to convert the voltage of the tractor's crank battery 14, which may be maintained at around 13.5V, to an amplified voltage required for the particular circuit, which in this example is 12V for charging and maintaining the liftgate batteries 24.

Figure 4:
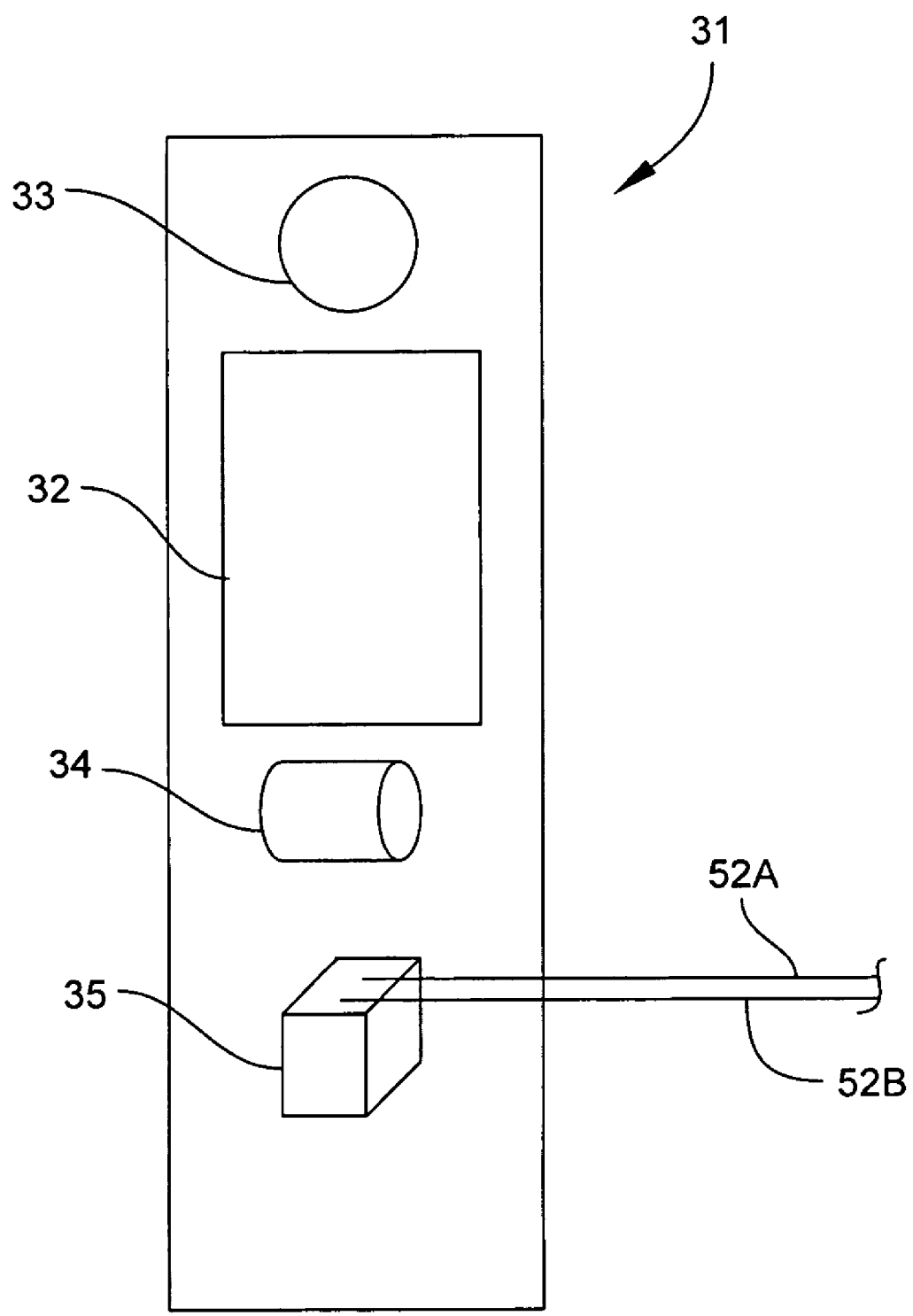
FIG. 4 is schematic illustrating various components of the exemplary reefer unit on the trailer.

In addition to the liftgate 21, the exemplary trailer 10B has a refrigeration unit 31 (or "reefer") with its own electrical charging system that is also independent of the tractor's charging system. As shown in FIG. 4, the reefer 31 comprises an electrically-powered cooling device incorporating known parts and components including, for example, a diesel-fuel powered generator 32, an alternator 33, starter motor 34, and batteries 35. As generally known and understood in the art, the generator 32 is mechanically connected to the alternator 33, which converts the mechanical energy of the generator 32 into electricity which is used to power the cooling device. The electricity generated by the alternator 33 is transferred to the cooling device through electrical wiring. The reefer batteries 35 activate the starter motor 34, which in turn powers the generator 32. Once the generator 32 is running, the control electronics cause the starter motor 34 to be deactivated. The generator 32 then causes the alternator 33 to produce electricity for the cooling device. In addition to providing power to the cooling device, the alternator 33 also charges the reefer batteries 35 for the generator 32 (which are at least partially drained when they are used to power the starter motor).

Battery Charge Controller 50

Figure 5:
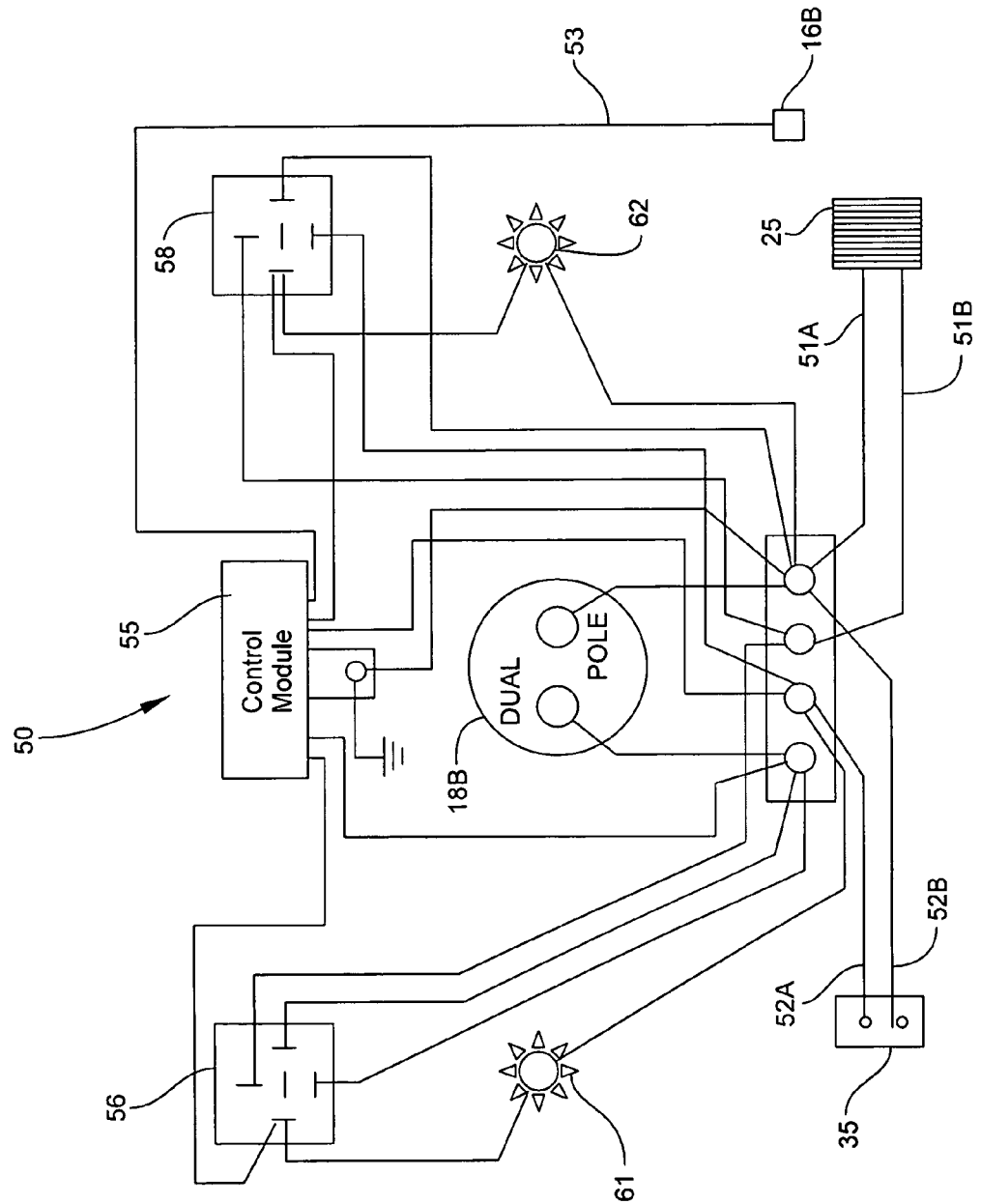
FIG. 5 is schematic illustrating various electrical connections of a battery charge controller incorporated in the exemplary tractor/trailer combination.

Referring to FIGS. 1A, 3, and 5, the exemplary battery charge controller 50 operates to selectively couple the liftgate batteries 24 via cables 51A, 51B and a source of onboard electrical power—namely, the tractor's crank battery 14 (through the power line cable 15 or dual pole cable 17) and reefer electrical system via cables 52A, 52B, including the reefer batteries 35. Cable 53 electrically connects the charge controller 50 to the power line receptacle 16B. In the exemplary embodiment, the charge controller 50 comprises a microprocessor-based control module 55 including a voltage comparator, a communications system (communicating via the power line cable), and electrical switching devices 56, 58, such as electromagnetic or solid-state relays (e.g., 80-amp), switching transistors and the like. The control module 50 monitors the voltage level of the various onboard electrical power sources, and controls switching devices 56, 58 to selectively open and close electrical circuits to manage current flow to the liftgate batteries 24. For example, if the output voltage of crank battery 14 is above a first predetermined voltage threshold, the switching device 56, 58 closes an electrical crank battery circuit enabling use of electrical energy from the crank battery 14 to recharge the liftgate batteries 24. In this case, electrical current is transferred from the tractor's crank battery 14 along the power line cable 15 (e.g., auxiliary conductor—pin #7), through cable 53 and cables 51A, 51B to the DC-DC converter 25 to the trailer's liftgate batteries 24. If the output voltage of crank battery 14 is below the predetermined threshold voltage, then control module 55 commands switching device 56, 58 to open the electrical crank battery circuit inhibiting auxiliary use of electrical energy from the crank battery 14. The control module 55 and switching devices 56, 58 cooperate to maintain sufficient charge (e.g., 12.2 volts) in the crank battery 14 to start the vehicle 10. The state of switching devices 56, 58 may be indicated by respective LED's 61, 62.

In one exemplary implementation, the charge controller 50 first determines an engine-on or engine-off condition of the tractor 10A, and whether the trailer 10B is electrically connected to the tractor engine's electrical system via the vehicle power line cable 15 and/or dual pole (or similar) cable 17, or not at all. In the engine-off condition and sensing a crank battery output voltage of greater than 12.2 volts, the control module 55 determines an available means for transferring current from the tractor electrical system to the trailer's liftgate batteries 24. If a dual pole connection exists (via cable 17), the control module 55 commands switching device 56, 58 to close an electrical auxiliary connection circuit enabling the crank battery 14 to charge the liftgate batteries 24 via the dual pole cable 17 connection, and opens an electrical power line circuit isolating the liftgate batteries 24 from the vehicle power line (and power line cable 15). In the absence of a dual pole connection through dual pole cable 17, the control module 55 commands switching device 56, 58 to close the electrical power line circuit enabling current transfer from the crank battery 14 to the DC-DC converter 25 and liftgate batteries 24 through the vehicle power line cable 15. Provided the tractor's crank battery 14 is maintained above the voltage threshold (12.2 volts), electrical current from the crank battery 14 remains a primary power source for charging the liftgate batteries 24.

In the event the crank battery voltage drops below 12.2 volts, the charge controller 50 causes switching device 56, 58 to open the crank battery circuit and electrically decouple the crank battery 14 and liftgate batteries 24. The charge controller 50 then determines whether the electrical system (e.g., battery 35) of the reefer 31 is running and producing current in excess of 13.2 volts—the reefer voltage threshold. If so, the control module 55 signals the switching device 56, 58 to close an electrical reefer power circuit enabling the transfer of current from the reefer electrical system (e.g. battery 35) via cables 52A, 52B and through cables 51A, 51B to the DC-DC converter 25 to charge the liftgate batteries 24. While above the reefer voltage threshold, the liftgate batteries 24 can be charged with the trailer 10B electrically disconnected from the tractor 10A and tractor engine's electrical system. In an alternative exemplary implementation, the reefer alternator 33 (as opposed to batteries 35) may be utilized to recharge the liftgate batteries 24. If the charge controller 50 senses a voltage drop below the reefer voltage threshold (13.2 volts), the control module 55 signals the switching device 56, 58 to open the electrical reefer power circuit causing the reefer electrical system (e.g., battery 35) to disconnect from the liftgate batteries 24. In this case, the liftgate batteries 24 do not resume charging unless and until the crank battery voltage exceeds 12.2 volts, or the reefer power voltage exceeds 13.2 volts.

In addition to the above, the charge controller 50 may incorporate means (not shown) for sensing temperature of the vehicle engine, and for automatically adjusting the crank battery voltage threshold based on the sensed temperature of fluid present in the engine. For example, in cold weather conditions, the charge controller may set the crank battery voltage threshold at 12.5 volts or more. This feature will provide more reserve power in the tractor batteries for starting. The charge controller 50 may also incorporate a sensor for determining ambient air temperature, and means for automatically adjusting the crank battery voltage threshold based on this temperature. Determining accurate battery voltage of the tractor can be done by turning off the DC/DC converter for a few seconds and then sampling the voltage level without the load. Such testing can be an accurate technique for determining battery pack capacity from an off-site source. This process can be repeated at predetermined intervals, and repeated until the battery voltage reaches a specific level.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

We claim:

1. In a vehicle comprising a crank battery, a rechargeable auxiliary battery, and an onboard electrical power source separate from said crank battery and said auxiliary battery, a battery charge controller for managing a supply of electrical energy to said auxiliary battery to charge said auxiliary battery, said battery charge controller comprising:
   means for monitoring a voltage level of said crank battery;
   means for monitoring a voltage level of said onboard electrical power source;
   means for electrically coupling said crank battery and said auxiliary battery to charge said auxiliary battery when the voltage level of said crank battery exceeds a first voltage threshold, and for electrically decoupling said crank battery and said auxiliary battery when the voltage level of said crank battery is below said first voltage threshold; and
   means for electrically coupling said onboard power source and said auxiliary battery to charge said auxiliary battery when: (i) the voltage level of said crank battery is below said first voltage threshold and (ii) the voltage level of said onboard power source exceeds a second voltage threshold, and for electrically decoupling said onboard power source and said auxiliary battery when the voltage level of said onboard power source is below said second voltage threshold.

2. A battery charge controller according to claim 1, wherein said first voltage threshold is greater than 12.2 volts.

3. A battery charge controller according to claim 2, wherein said second voltage threshold is greater than 13.2 volts.

4. A battery charge controller according to claim 1, wherein said onboard electrical power source comprises an electrical system of an onboard refrigeration unit.

5. A battery charge controller according to claim 4, wherein the electrical system of said refrigeration unit comprises a battery and an alternator.

6. A battery charge controller according to claim 1, wherein said means for electrically coupling said crank battery and said auxiliary battery, and for electrically coupling said onboard power source and said auxiliary battery comprises at least one switching device.

7. A battery charge controller according to claim 6, wherein said switching device comprises a relay.

8. A battery charge controller according to claim 1, wherein said means for monitoring a voltage level of said crank battery, and for monitoring a voltage level of said onboard electrical power source comprises a microprocessor-based control module.

9. A battery charge controller according to claim 1, wherein said rechargeable auxiliary battery is electrically connected to a vehicle liftgate.

10. In a heavy duty vehicle comprising a tractor/trailer combination, a vehicle power line electrically interconnecting said tractor and said trailer, a crank battery carried by said tractor and electrically connected to said vehicle power line, a rechargeable auxiliary battery carried by said trailer, a voltage converter carried by said trailer and electrically connected to said auxiliary battery, and an onboard electrical power source carried by said trailer and separate from said crank battery, said auxiliary battery, and said voltage converter, a charge controller for managing a supply of electrical energy to said voltage converter to charge said auxiliary battery, said charge controller comprising:
   means for monitoring a voltage level of said crank battery;
   means for monitoring a voltage level of said onboard electrical power source;
   means for electrically coupling said crank battery and said voltage converter to charge said auxiliary battery when the voltage level of said crank battery exceeds a first voltage threshold, and for electrically decoupling said crank battery and said voltage converter when the voltage level of said crank battery is below said first voltage threshold; and
   means for electrically coupling said onboard power source and said voltage converter to charge said auxiliary battery when: (i) the voltage level of said crank battery is below said first voltage threshold and (ii) the voltage level of said onboard power source exceeds a second voltage threshold, and for electrically decoupling said onboard power source and said voltage converter when the voltage level of said onboard power source is below said second voltage threshold.

11. A battery charge controller according to claim 10, wherein said vehicle power line comprises a plurality of electrical conductors, and a multi-pin connector interconnecting conductors of said tractor and said trailer.

12. A battery charge controller according to claim 11, wherein said connector comprises a SAE J560 seven-pin connector.

13. A battery charge controller according to claim 10, wherein said first voltage threshold is greater than 12.2 volts.

14. A battery charge controller according to claim 13, second voltage threshold is greater than 13.2 volts.

15. A battery charge controller according to claim 10, wherein said onboard electrical power source comprises an electrical system of an onboard refrigeration unit.

16. A battery charge controller according to claim 15, wherein the electrical system of said refrigeration unit comprises a battery and an alternator.

17. A battery charge controller according to claim 10, wherein said means for electrical coupling said crank battery and said voltage converter, and for electrically coupling said onboard power source and said voltage converter comprises at least one switching device.

18. A battery charge controller according to claim 17, wherein said switching device comprises a relay.

19. A battery charge controller according to claim 10, wherein said means for monitoring a voltage level of said crank battery, and for monitoring a voltage level of said onboard electrical power source comprises a microprocessor-based control module.

20. A battery charge controller according to claim 10, wherein said rechargeable auxiliary battery is electrically connect to a vehicle liftgate.

* * * * *